S. S. GRAY.
Paper-Collar.
No. 6,691. Reissued Oct. 11, 1875.
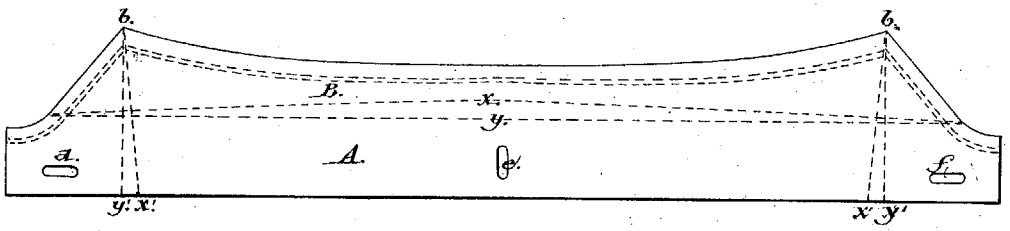
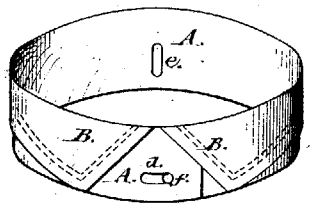
Witnesses:
N. Ames Jun
N. Ames.
Inventor:
Solomon S. Gray
N. PETERS, PHOTO-LITHOGRAPHER, WASHINGTON, D. C.

UNITED STATES PATENT OFFICE.

SOLOMON S. GRAY, OF BOSTON, MASSACHUSETTS, ASSIGNOR, BY MESNE ASSIGNMENTS, TO THE UNION PAPER-COLLAR COMPANY, OF NEW YORK CITY.

IMPROVEMENT IN PAPER COLLARS.

Specification forming part of Letters Patent No. 38,961, dated June 23, 1863; reissue No. 1,646, dated March 29, 1864; reissue No. 6,691, dated October 11, 1875; application filed September 2, 1875.

*To all whom it may concern:*

Be it known that I, SOLOMON S. GRAY, of Boston, in the county of Suffolk and Commonwealth of Massachusetts, have invented a new and useful improvement in the manufacture of turn-over shirt-collars of paper, or paper and cloth combined; and I do hereby declare that the following is a full, clear, and exact description of the same, reference being had to the accompanying drawing forming a part of this specification, in which—

Figure 1 is a plan of a collar before it is turned over. Fig. 2 is a perspective view of the same turned over and brought into a circular form, as on a person's neck.

Like parts are indicated by the same letters in both of the drawings.

A great defect in turn-over collars (especially collars made of paper, or cloth and paper united) has been the wrinkling or puckering of the inner part when brought to a circular form, as on a person's neck, occasioned by the inner part, of necessity, occupying a smaller circle than the outer one. This defect has been obviated in manufacturing linen collars by bending them over a block on a curved line, *x*, instead of a straight line, *y*, so that the corners *b b* of the turn-over part B will strike the points *x′ x′* instead of *y′ y′*, as they would if the collar were turned over on the straight line *y*, by which it is evident that the longer space from *y′* to *y′*—*i. e.*, from *b* to *b*—has only to cover the shorter space from *x′* to *x′* on the part A forming the inner circle, and thus the inner circle will not be wrinked or puckered by the tension of the outer one.

The object of my invention is to so carry out this improvement, in connection with turn-over collars of paper, or paper and muslin combined, as to facilitate and economize the manufacture of collars of this class.

To enable others skilled in the art to practice my invention, I will now proceed to describe the operation, which is applicable to different styles of turn-over collars made of paper, or paper and cloth combined.

Fig. 1 represents a collar before being turned over, *d*, *e*, and *f* being button-holes punched in the usual manner.

Prior to my invention paper, or paper and cloth, collars have been turned over in the straight line *y*, (represented by the dotted line in Fig. 1,) and the practical objections to all such collars have been described above. The line *x*, however, as will be seen by inspecting Fig. 1, is a curve, or the arc of a circle, and on this line the part B is turned over on the part A. The best mode of doing this is to make in the collar an impression of the curve or line on which it is to be turned over by means of a die pressed upon it. When this is done the collar can be readily turned over, following the indented line.

The line *x*, however, instead of being a curve or the arc of a circle, might be composed of straight lines with an angle at the center of the collar and accomplish the object desired about as well. I prefer, however, to make it, *x*, the exact arc of a circle.

The drawings are as large as a medium-sized collar, and the greatest distance from the straight line *y* to the curved line *x* is about one-fourth of an inch. It may, however, be a little more or less.

I claim as my invention and as an improvement in the art of manufacturing turn-over collars of paper, or paper and cloth combined—

The mode described of first making a curved indentation in the collar and then folding the same on the indented curve, as set forth.

In testimony whereof have hereunto set my hand in the presence of two subscribing witnesses.

SOLOMON S. GRAY.

Witnesses:
EEWIN W. BROWN,
EDWIN A. KIRK.